United States Patent
Chabrier

[15] 3,695,127
[45] Oct. 3, 1972

[54] TOOL SUPPORT FOR A MACHINE TOOL

[72] Inventor: Martial Chabrier, Le Pecq, France

[73] Assignee: C.N.M.P. Berthiez, Paris, France

[22] Filed: June 1, 1970

[21] Appl. No.: 41,908

[30] Foreign Application Priority Data

June 6, 1969 France..................6918820

[52] U.S. Cl........................82/36 R, 82/37, 90/11 D
[51] Int. Cl.........................B23b 29/08, B23b 29/12
[58] Field of Search..90/11 A, 11 D; 83/637; 29/407, 29/465; 279/16, 99, 100, 101; 82/36 R, 36 B, 37

[56] References Cited

UNITED STATES PATENTS 3,271,848   9/1966   Montandon..................29/407

Primary Examiner—Francis S. Husar
Attorney—Delio & Montgomery

[57] ABSTRACT

A tool support for a machine tool comprises support structure adapted to be attached to the machine tool and a tool holder adapted to receive a tool, the support structure and tool holder comprising a screw and nut to draw the support structure and tool holder towards each other into abutting relationship while permitting relative movement in another direction, corrugations on the support structure and the tool holder interengaging to constrain the last-mentioned relative movement to said another direction, an inclined surface being provided on the tool holder, the surface extending transversely of the said another direction and being engaged by spring-loaded plungers in the support structure whereby to effect relative movement of the support structure and tool holder in said another direction to predetermined relative positions.

13 Claims, 4 Drawing Figures

Inventor
Martial Chabrier
By De Lio and Montgomery
Attorneys

TOOL SUPPORT FOR A MACHINE TOOL

The present invention relates to a tool support for a machine tool for geometrically positioning and fastening a tool upon the machine. The tool is mounted in a tool holder which may be interchangeable with other similar tool holders so that a variety of tools can be efficiently used.

An aim of the invention is to obtain very great accuracy in the positioning of the tool holder when it is fitted on the machine tool, and in the preliminary adjustment of said tool holder. A subsidiary aim is to provide extremely firm and stable fastening of the tool holder on the machine tool, so as to eliminate all deformation of said tool holder, even under the effect of a shock or of a heavy cutting force, which would entail the risk of a lack of geometrical accuracy in the actual machining. Yet another aim is to eliminate all manual intervention, other than the offering-up of the tool holder, in effecting the geometrical positioning and fastening; thus, the device of the invention is applicable to any machine tool which is designed to operate with manual loading and equipped with an automatic loading device. Finally, another aim of the invention is to make the manufacture of the device simple, easy, effective, and economical.

The invention is particularly, but not exclusively, applicable to a tool support for a vertical lathe, for example, having one or two columns, and an arm or cross-member which carries at least one carriage adapted to move horizontally, and in which a slide or support structure, on a face of which the tool holder is to be fixed, is adapted to move vertically.

Accordingly, the invention provides a tool support for a machine tool, comprising support structure, means for attaching the support structure to a machine tool, a tool holder having means to receive a tool, the support structure and tool holder comprising connecting means interengaging to draw the support structure and tool holder into abutting relationship by relative movement in a predetermined direction whilst permitting relative movement in another direction, guide means carried by the support structure and the tool holder, the guide means interengaging to constrain the last-mentioned relative movement to said another direction, and locating means carried by the support structure and the tool holder, the locating means comprising means defining an inclined surface extending transversely of the said another direction and means engaging said surface and effecting relative movement of the support structure and tool holder in said another direction to predetermined relative positions.

Various other characteristics of the invention will be clear from the following detailed description.

One embodiment of the invention is illustrated, by way of non-limitative example, in the accompanying drawings, in which.

Figure 1:
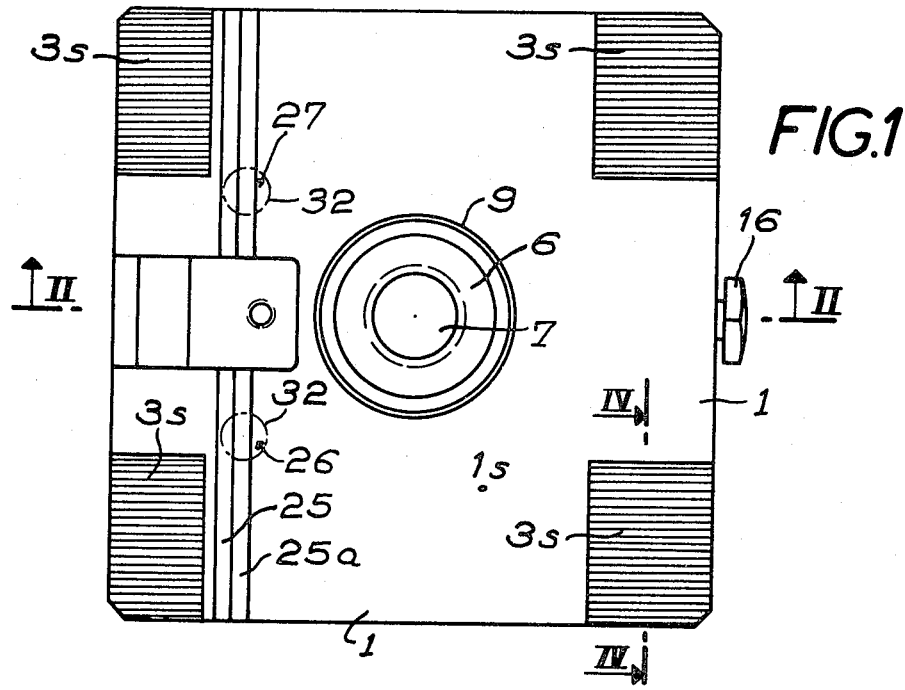
FIG. 1 is a plan view of the top face of a tool holder (considered to have a vertical axis) forming part of a tool support of the invention.

Referring to FIG. 1, there is shown a tool holder 1 attached to a support structure or slide 2 of a vertical lathe carriage under very precise conditions of positioning and very effective conditions of fastening. The tool holder 1 and the slide 2 are illustrated only partially and in a highly diagrammatic form; their common axis is vertical in the particular application selected and will be considered to be vertical in the following description, although there is no reason why it should not be horizontal or inclined.

Figure 4:
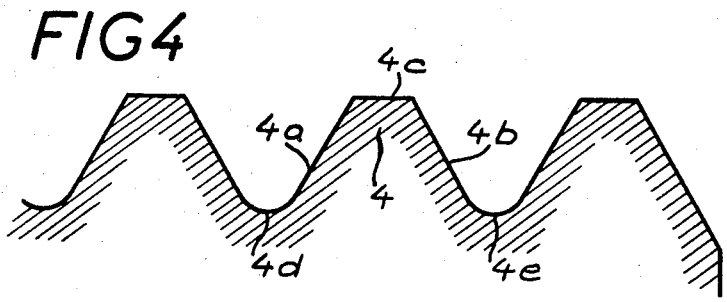
FIG. 4 is a partial section on a larger scale along the line IV—IV in FIG. 1.

The upper face 1s of the tool holder 1 is provided at its four corners with corrugated portions 3s, which are preferably planar, while in particular the corrugations are all parallel to one another. Similarly, the bottom face 2i of the slide 2 is provided at its corners with corrugated portions 3i which, when the tool carrier is in the installed position (FIG. 2), are situated opposite the corrugated portions 3s, and have a shape complementary to that of the latter. For example, the corrugations of the portions 3s and 3i may have the profile illustrated in FIG. 4. They are cut with a constant pitch and have a substantially triangular profile; consequently, each corrugation 4 of a portion 3s or 3i has two symmetrical inclined flanks 4a and 4b, which are connected together by a truncated flat crest 4c and are connected to the adjacent flanks of the two contiguous corrugations by rounded troughs 4d and 4e. The corrugations constitute guide means to constrain any movement of the tool holder 1 and the slide 2 while being drawn together to be parallel to the corrugations.

Figure 2:
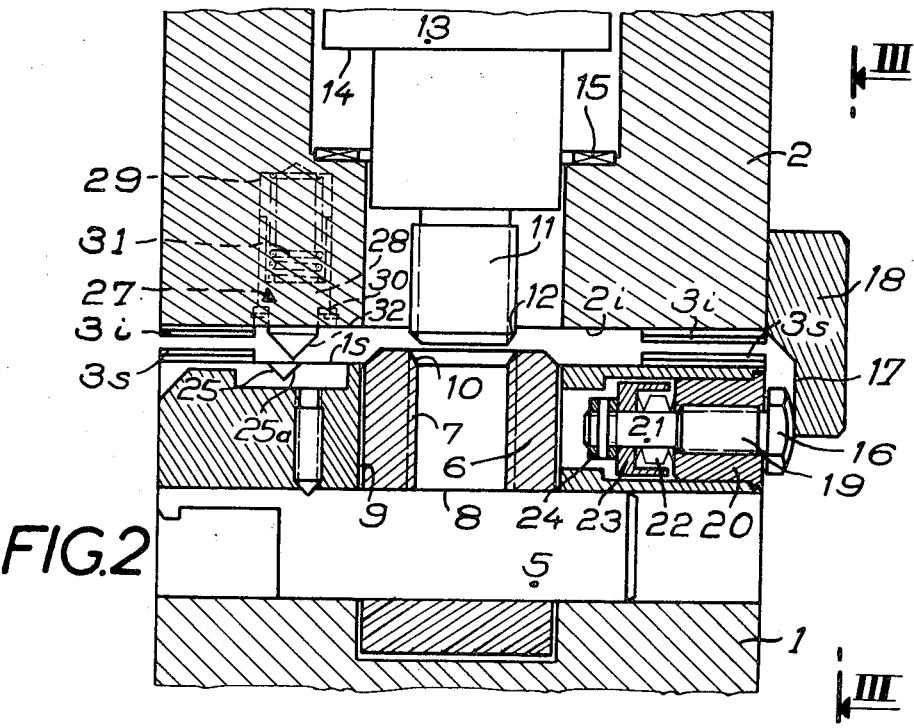
FIG. 2 is a section taken along the line II—II in FIG. 1 and showing the cooperating parts of the device which are situated in said tool holder and in associated support structure.

As FIG. 2 clearly shows, the corrugation 4 of the portions 3s of the tool holder 1 all extend parallel to a cylindrical rod 5 fastened in said tool holder. Upon the rod 5 is slidably mounted a threaded nut 6. The nut 6 is cylindrical and has a central tapped hole 7 and a diametral bore 8 which receives the rod 5, the axes of the hole 7 and bore 8 being perpendicular. The nut 6 is received in a cylindrical socket 9 of larger diameter which is provided in the tool holder 1. Thus, the nut 6 is free to perform limited movement of translation along the rod 5, parallel to the corrugations in order to permit a centring action described below. The top edge of the hole 7 is bevelled at 10 and the nut 6 is situated substantially in the center of the face 1s (FIG. 1); it is intended to engage a screw 11 which also is bevelled at 12 and is connected to a unit 13 for rotating the screw and permitting it longitudinal axial movement. The unit 13 and the screw 11 are mounted in the slide 2 and the downward movement of this screw 11 is limited by contact between a shoulder 14, provided on the assembly of which the screw forms part, and a rotating stop 15 (for example, of the needle-bearing type) which is disposed in the slide.

The nut 6 and screw 11 form a connecting means for drawing the tool holder and the slide 2 together.

There is provided a stop 16 to limit relative movement of the tool holder 1 and the slide 2 parallel to the corrugations. The stop 16 is preferably adjustable and adapted to be applied against a face 17 of a part 18 formed on or fastened to the slide 2. This stop may be of any type, but, when it is adjustable, it is convenient for it to be formed by a head, rounded and hardened by any suitable treatment, of a screw 19 mounted in a nut 20 fastened to the tool holder 1. The screw 19 is extended by a stem 21 connected to a spring enabling the play between the screw threads of the screw and nut to be taken up. In the example selected, this spring is constituted by a stack of elastic conical "Belleville" washers 22, interposed between the nut 20 and a cup 23 mounted for sliding on the stem 21 and bearing against a ring 24 fastened on the latter.

The upper face 1s of the tool holder 1 has a locating means comprising at least one inclined surface extending transversely of the direction of movement constrained by the corrugations. The surface in this case is a plane surface 25a extending perpendicularly to the rod 5 and the corrugations, and cooperating with another part of the locating means, comprising at least two plungers 26, 27 on the slide 2, which are situated so as to form two apices of a triangle, the third apex of which is the adjustable stop 16. More particularly, the inclined surface 25a in question is constituted by one of the flanks of a V-slot 25 cut in the top face 1s of the tool holder (FIG. 1 and 2). Each of these two plungers 26 and 27 (FIG. 1) may be replaced by any other suitable arrangement provided that it applies a pressing force against the inclined surface 25a in such a manner that this produces a sliding of the tool holder towards the part 18 until the stop 16 is applied effectively against the support face 17 of the part 18. In the embodiment illustrated in FIG. 2, each of the plungers 26 and 27 is constituted by a cylindrical rod 28 mounted for sliding in a socket 29 in the slide 2, the stroke of said cylindrical rod being limited at at least one end by a fixed washer 30. Between said rod 28 and the bottom of the socket 29 there is interposed a spring 31 which is sufficiently powerful to apply the pressing force mentioned previously to the plunger in question. In addition, each plunger has a conical (i.e., tapered) end 32 projecting from the slide 2 and adapted to cooperate with the inclined flank 25a of the slot 25 in the tool holder.

Figure 3:
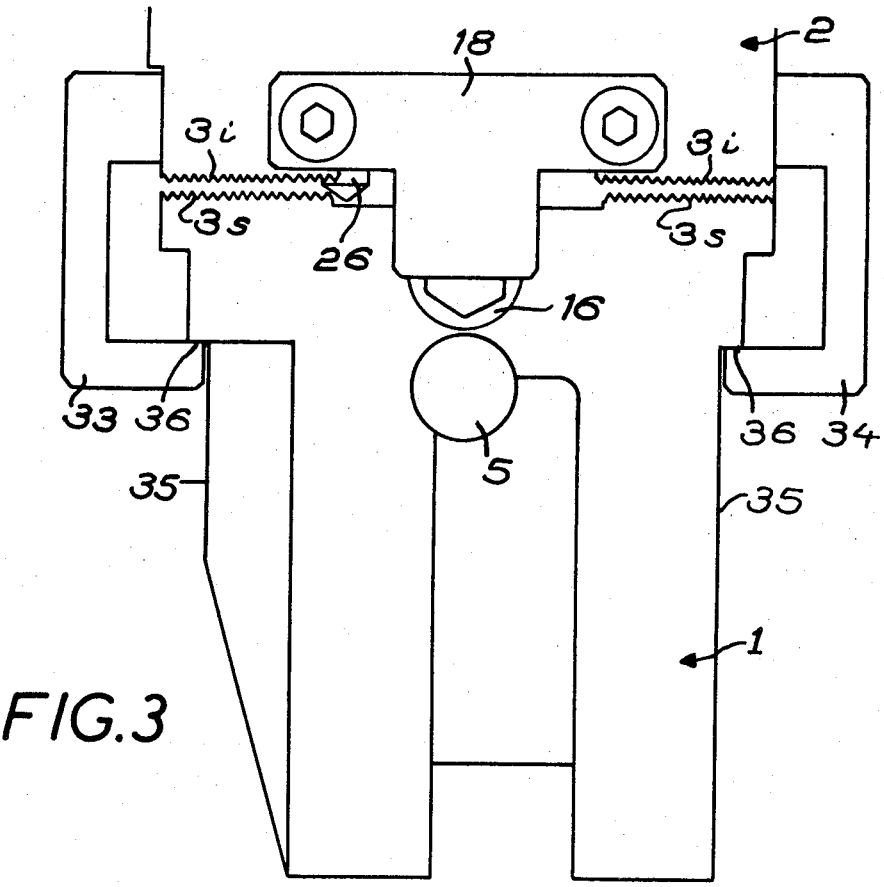
FIG. 3 is an elevation taken along the line II—II in FIG. 2.

When a tool holder is fitted to or removed from the slide 2, it is necessary to support said tool holder and also to loosely guide it, parallel to the corrugated portions 3i and 3s, in order to permit its introduction and extraction either manually or automatically. For this purpose, as will be seen from FIG. 3, the slide 2 carries two sections 33 and 34 constituting a support means for the tool holder 1, and which cooperates for the purpose of guidance with faces 35 on the tool holder, and, for the purpose of support, with shoulders 36 thereon.

The tool support operates in the following manner.

The operator or an automatic loading device introduces the tool holder 1 into the sections 33 and 34 until the stop 16 comes substantially into contact with the part 18. From that moment onwards the tool support functions automatically. The unit 13 lowers the screw 11 by rotation, the terminal bevel 12 of said screw centering the nut 6 by coming into contact with the bevel 10 on the latter. The screw 11 then engages the tapped bore 7 and, when the shoulder 14 bears against the rotating stop 15 on the slide 2, the screw 11 ceases to move downwards and, continuing to turn, draws the nut 6, and thus also the tool holder 1, towards the slide 2. The corrugated portions 3s of the latter engage the corrugated portions 3i on the slide and accurately effect the positioning of the tool holder in relation to the slide in the direction perpendicular to said corrugations. The tool holder and slide are thus constrained to relative movement parallel to the corrugations.

During the same movement the conical portions 32 of the plungers 26 and 27 come into contact with the inclined flank 25a of the slot 25 in the tool holder and, if necessary, effect relative movement of the slide and the tool holder until the stop 16 is applied against the contact face 17 of the part 18 of the slide. Then the tool holder and the slide are in predetermined relative positions.

In view of the fact that the contact between the tool holder and the slide is made at three points (the stop 16 and the plungers 26 and 27), the corrugations on the portions 3s and 3i are perfectly parallel to one another during the remainder of the movement towards one another, in the course of which the corrugated portions 3s and 3i engage perfectly in one another, the stop 16 remaining applied against the part 18 and the plungers being progressively retracted by compressing their springs 31. At the end of this movement the screw 11, continuing to act on the nut 6, locks the tool holder 1 against the slide 2.

I claim:

1. A tool support for a machine tool, comprising support structure, means for attaching the support structure to a machine tool, a tool holder having means to receive a tool, the support structure and the tool holder having surfaces which are to be drawn into abutting relationship, connecting means interengaging to draw said surfaces into said abutting relationship by relative movement in a predetermined direction while permitting relative movement in another direction, guide means carried by the support structure and the tool holder, said guide means comprising corrugations on said surfaces, the corrugations having complementary shapes and extending parallel to each other, the guide means interengaging to constrain the last-mentioned relative movement to said another direction, and locating means carried by the support structure and the tool holder, the locating means comprising means defining an inclined surface extending transversely of the said another direction and means engaging said inclined surface and effecting relative movement of the support structure and tool holder in said another direction to predetermined relative positions.

2. A tool support as claimed in claim 1 wherein the surfaces have plane portions at the corners thereof, the corrugations being provided in said plane portions of the said surfaces.

3. A tool support as claimed in claim 1 wherein the corrugations are of constant pitch and each corrugation has two symmetrical inclined flanks connected together by a truncated plane crest, adjacent flanks of adjacent corrugations being joined by rounded troughs.

4. A tool support as claimed in claim 1 wherein the connecting means comprises the combination of a screw, means mounting the screw for rotation and linear movement longitudinally of itself, a captive threaded nut adapted to threadedly engage the screw and means permitting said nut limited freedom of movement parallel to said another direction.

5. A tool support as claimed in claim 4 further including a rod, means slidably mounting the nut on the rod for movement parallel to said another direction, means defining a socket similar in shape to but larger than the external cross-section of the nut, the nut being disposed in the socket with said limited freedom of movement.

6. A tool support as claimed in claim 4 wherein the nut and the screw have corresponding cooperating bevelled centering surfaces assisting threaded engagement of the nut and the screw.

7. A tool support as claimed in claim 1 wherein the means defining the inclined surface defines a slot having mutually inclined flanks, the inclined surface being one of said flanks.

8. A tool support as claimed in claim 1 wherein the means for engaging the inclined surface comprise at least two plungers and means resiliently biassing the plungers for movement longitudinally of themselves.

9. A tool support as claimed in claim 8 comprising means mounting the plungers for said movement thereof parallel to the first-mentioned relative movement of the support structure and the tool holder.

10. A tool support as claimed in claim 8 wherein the plungers have tapered ends which cooperate with the inclined surface.

11. A tool support as claimed in claim 1 wherein a stop is provided to limit the relative movement of the support structure and the tool holder effected by the locating means in the said another direction, thereby defining the said relative predetermined positions.

12. A tool support as claimed in claim 11 wherein the stop is adjustable and comprises a screw and a threaded member engaged thereby, resilient means eliminating slackness between the screw and the threaded member.

13. A tool support as claimed in claim 1 comprising support means for detachably supporting the tool holder spaced from the support structure prior to interengagement of the connecting means, the support means permitting relative movement of the support structure and the so-supported tool holder in the said another direction.

* * * * *